(12) United States Patent
VanMeter

(10) Patent No.: US 8,887,448 B2
(45) Date of Patent: Nov. 18, 2014

(54) ADJUSTABLE TORSION LIFT ASSIST SYSTEM WITH ONE-WAY BIAS FOR TRAFFIC-RATED UTILITY VAULT COVER

(71) Applicant: Vault Access Solutions & Fabrications, Reno, NV (US)

(72) Inventor: Rick VanMeter, Wheatland, CA (US)

(73) Assignee: Vault Access Solutions & Fabrications, Reno, NV (US)

( * ) Notice: Subject to any disclaimer, the term of this patent is extended or adjusted under 35 U.S.C. 154(b) by 0 days.

(21) Appl. No.: 13/858,188

(22) Filed: Apr. 8, 2013

(65) Prior Publication Data
US 2014/0298731 A1    Oct. 9, 2014

(51) Int. Cl.
*E02D 29/14*    (2006.01)
(52) U.S. Cl.
USPC .................................................. 52/20; 52/19
(58) Field of Classification Search
CPC .............. E05F 1/123; E05Y 2900/132; E05Y 2900/612
USPC .............. 52/19, 20; 49/333, 324; 16/277, 308
See application file for complete search history.

(56) References Cited

U.S. PATENT DOCUMENTS

| | | | | |
|---|---|---|---|---|
| 4,133,074 A | * | 1/1979 | Schack | 16/308 |
| 5,373,665 A | * | 12/1994 | Lyons, Sr. | 49/386 |
| 5,515,876 A | * | 5/1996 | Warner et al. | 134/57 D |
| 5,771,540 A | * | 6/1998 | Carpenter et al. | 16/308 |
| 6,754,081 B2 | * | 6/2004 | Rude et al. | 361/725 |
| 8,061,954 B2 | * | 11/2011 | Lambright | 414/537 |
| 8,549,710 B2 | * | 10/2013 | Novin | 16/308 |

* cited by examiner

*Primary Examiner* — Jeanette E Chapman
*Assistant Examiner* — Daniel Kenny
(74) *Attorney, Agent, or Firm* — Craig A. Simmermon

(57) ABSTRACT

A hinge member providing a pivotal connection between a utility vault hatch and a utility vault frame that provides an adjustable torsion lift system with one-way bias. Hinge member comprises a fixed end socket, a floating end socket, a torsion bar member, and a collar member. Fixed end socket and floating end socket are rigid cylindrical members with a cylindrical exterior surface and a polygonal socket at in its interior. Torsion bar member is an oblong rod or bar with an external polygonal shape that fits the polygonal sockets on the fixed end socket and the floating end socket. Collar member is a rigid cylindrical member with a cylindrical exterior surface and a hollow cylindrical center. Collar member has a T-slot void cut into its cylindrical exterior surface. Floating end socket further comprises an ear member, which is inserted into the T-slot of collar member.

1 Claim, 8 Drawing Sheets

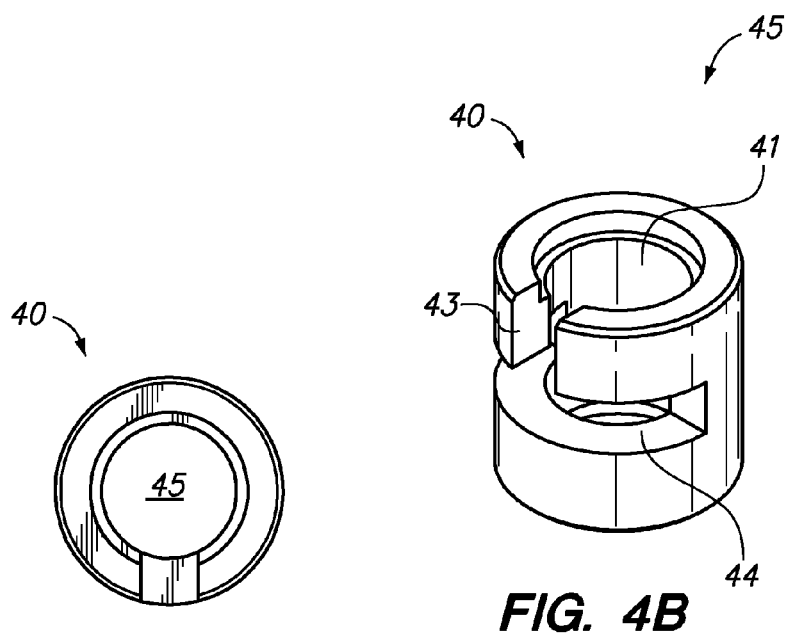
FIG. 4A  FIG. 4B
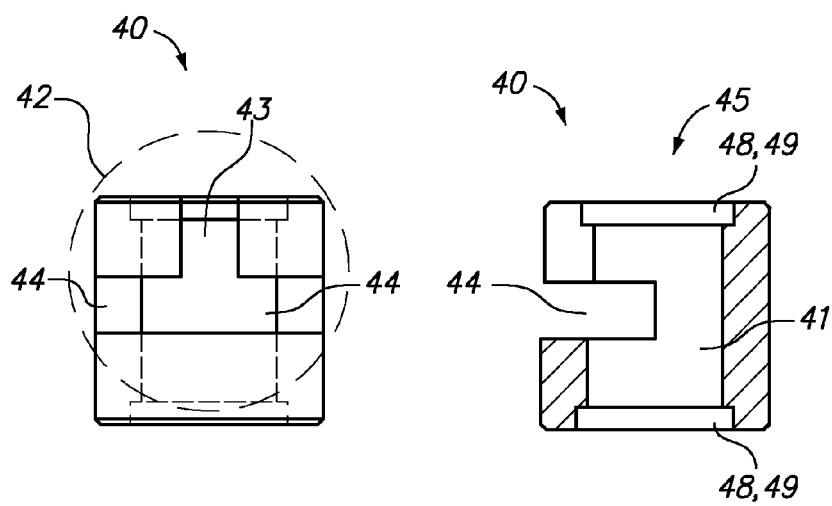
FIG. 4C  FIG. 4D

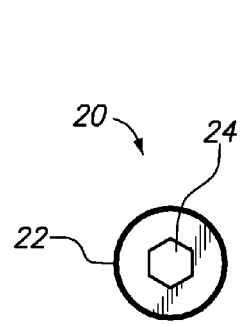
FIG. 8A
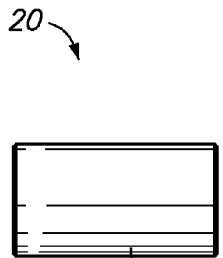
FIG. 8B
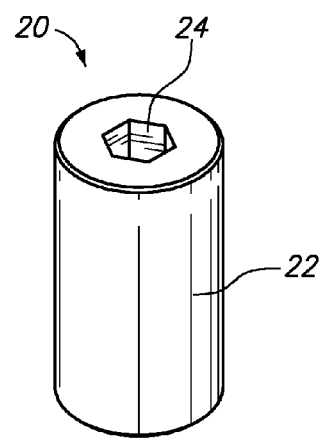
FIG. 8C
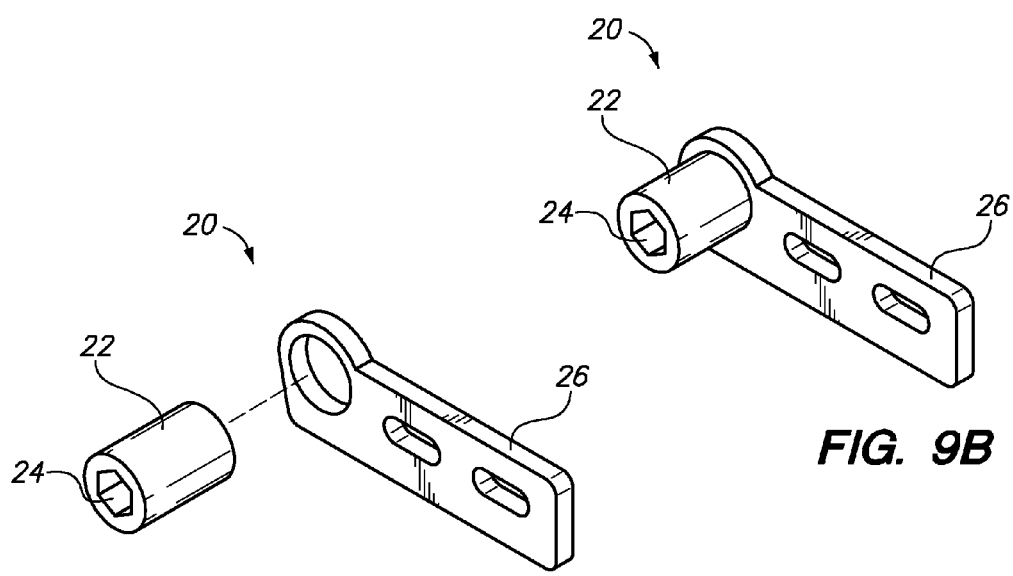
FIG. 9A
FIG. 9B

ADJUSTABLE TORSION LIFT ASSIST SYSTEM WITH ONE-WAY BIAS FOR TRAFFIC-RATED UTILITY VAULT COVER

BACKGROUND OF THE INVENTION

1. Field of the Invention

This invention relates to traffic-rated covers for underground utility vaults and more specifically those traffic-rated covers that are spring-loaded to "pop-up" or spring open upon the release of a latching mechanism or locking mechanism of the cover.

2. Description of Related Art

A utility vault is an underground room providing access to subterranean public utility equipment, such as valves or other flow control devices for drinking water, drainage water, sewage, natural gas, or steam distribution networks, or switches, routers, or other electronic equipment for electric, telecommunications, television, or internet distribution networks. Utility vaults are similar to mechanical or electrical rooms in design and content. Utility vaults are located underground for aesthetic, safety, and security reasons. Typically, utility delivery networks include a series of main lines connected to branch lines that provide utility connections to individual houses and apartments. There could be a utility vault located at every junction between main lines and every junction between main line and branch line and at every junction between branch lines. Utility vaults are required with most sewer and drainage storage tanks, flow junctions, pump houses, and other areas of the sewage and drainage system of a village, municipality, town, city, or county. Thus, a typical utility distribution network or system includes a large number of utility vaults. Utility vaults are commonly constructed out of reinforced concrete boxes, poured cement, or brick. Utility vaults are typically entered through a manhole or vault cover on the upper surface or ceiling of the utility vault. Utility vault covers are used to prevent accidental and unauthorized access to a utility vault. Utility vault covers typically have latching and/or locking mechanisms to prevent unauthorized access to the utility vault.

A utility vault is typically a rectangular or square cuboid or box-shaped room. The utility vault cover is typically on the upper face of the cuboid. A utility vault cover is typically rectangle or square-shaped. A utility vault cover typically has one or two doors or hatches pivotally attached at one end to the upper face of the cuboid. A hatch is typically rotated upward to open the cover and gain access to the utility vault and pivotally rotated downward to close the cover and eliminate access to the utility vault.

A utility vault cover typically comprises a frame and a hatch. The frame is a closed-perimetered rigid assembly with an open center that is typically rectangular-shaped or square-shaped to fit the specific cuboid dimensions of the utility vault. The frame is attached to the utility vault on the upper face or at the upper edges of the vertical faces of the cuboid. The frame and utility vault are typically embedded into the ground with the upper surface of the frame generally flush with the upper surface of the ground of the surrounding area, which is typically earth, concrete, asphalt, or similar.

The hatch is a rigid planar member sized to fit and cover the upper face of the cuboid-shaped utility vault and to marry with the frame to make a semi-weather-tight connection with the frame. The hatch is typically square or rectangular shaped. One edge of the hatch is pivotally mounted on one leg of the frame so that the edge of the hatch opposite the pivotally mounted edge may be lifted upward to open the hatch and pushed downward to close the hatch.

As stated, utility vaults are located underground, and, as a result, a traffic-rated utility vault cover must be sturdy enough to support pedestrian traffic and vehicular traffic passing over top of it without losing structural integrity, deflecting, or bending. A traffic-rated utility vault cover must be of a very heavy-duty design to support the enormous amounts of weight of the people, cars, and trucks that may pass over the utility vault. As a result, a traffic-rated utility vault cover is typically extremely heavy and as a result is extremely difficult for crews and workers to open and close.

To combat the heavy weight issue, traffic-rated utility vault covers may further comprise one or more lift mechanisms or pop-up mechanisms that function to lift and open the hatch partially and substantially help crews and workers open and close the hatch in order to gain access to the utility vault. Pop-up mechanisms provide an upward torque force to push and rotate the hatch upward and hold it open by a certain gap, typically about 12 inches, after the utility vault cover latch has been released and/or the lock has been unlocked. Thus, after the latch and/or lock of the utility vault cover have been disengaged, the pop-up mechanism becomes free to push and lift the hatch rotationally upward and hold it partially open at an acute angle with respect to the frame. The acute angle results in an open gap of typically about 12 inches.

This gap allows the worker to more easily grab hold of the hatch and lift it completely open by rotating it upward to an obtuse angle with respect to the frame to provide full clearance for the worker to enter the utility vault through the open frame. The pop-up gap should be set at the distance that is just enough to reduce the leverage force required to open the hatch to a quantity that is capable of being exerted by one typical worker. As the pop-up gap increases, weight from the heavy hatch is transferred to the hinges, making the hatch seem lighter and easier to open. The decrease in hatch weight is proportional to the cosine of the angle of the hatch opening. At zero angle or closed position, the full weight of the hatch is on the worker. At a 30-degree pop-up angle, 13 percent of the hatch weight has been reduced for the worker, where the effective hatch weight to the worker is then reduced to zero as the hatch angle approaches a 90-degree opening.

In the full open position, the hatch has been rotated to an obtuse angle where the hatch typically rests on a locking arm or other mechanism that functions to catch and hold the hatch up to prevent it from rotating too far open, to fall on the ground beside the utility vault. Thus, once the vault cover is rotated beyond the perpendicular point, the locking arm or other mechanism may support the hatch and prevent it from rotating to a position that is 180 degrees from the closed position and falling on the ground beside the utility vault. This occurrence is undesired because from this position, typically, a forklift or other heavy machinery is necessary to lift up the heavy utility vault cover hatch and rotate it back 180 degrees in order to close the hatch. On the other hand, with the current design, one worker can open and close the hatch without the use of a forklift or other heavy machinery.

There have been lift mechanisms or pop-up mechanisms in the prior art to perform this task; however, all prior art pop-up mechanisms suffer from a problem that occurs when the torque member or tension member used to supply the pop-up force wears, weakens, or warps to yield a decreased pop-up distance. Because of the extremely sturdy designs required of traffic-rated utility vault covers that must withstand the pounding abuse from vehicular traffic passing across the top of the utility vault cover, utility vault covers of this sort are extremely heavy. This extreme weight causes continuous heavy pressure from the heavy hatch on the pop-up mechanism, which causes the torque member or tension member to wear, weaken, or distort from its original position. This results in a reduction of torque or upward force, thereby causing a decrease in pop-up distance of the hatch upon release of the locking and/or latching mechanisms. Once the pop-up distance falls to 7 inches or less, it becomes much more difficult to get hold of the heavy hatch and rotate it all the way over for the locking arms to catch. As the pop-up gap of the lift mechanism gets smaller, the hatch becomes much more heavy to rotate upward. In extreme cases, the torque member or tension member cracks from the continuous pressure and breaks into pieces yielding total failure with zero pop-up distance.

A traffic-rated utility vault and a utility vault cover must typically last at least 10 years or more, while the torque member or tension member used to supply the pop-up force for traffic-rated utility vault covers typically loses substantial pop-up torque or force after only about one year. A loss of pop-up distance is the result of the weakening or wearing or distorting of the torque member or tension member used to supply the pop-up torque or force to the pop-up mechanism. For example, a new utility vault cover with pop-up distance initially set at 12 inches typically incurs a reduction in pop-up distance to about 6 inches after only one year of service. This is a 50 percent loss of pop-up distance after only 10 percent of the utility vault's lifespan. The task of opening the hatch of the utility vault becomes much harder as the pop-up distance decreases. Back injuries can occur more frequently when this happens. The result is that workers and utility crews have a much more difficult time opening the hatches of traffic-rated utility vault covers after they are just a few years old and this difficulty remains and worsens throughout the remainder of the vault's lifespan.

To combat the loss of pop-up distance problem, the applicant has devised an adjustable torsion lift system with one-way bias that does not push back onto the torque member or tension member as the hatch is opened or closed beyond the pop-up distance. This design yields much less stress on the torque member or tension member, thereby reducing wear, weakening, and warpage of the torsion device or spring. This design is a substantial improvement over the decades old industry standard of applying continuous torsion assisted lift by eliminating 100% of reverse stress on the torsion member.

To combat the loss of pop-up distance problem, the applicant has devised an adjustable torsion lift system with one-way bias that provides the ability to quickly and easily set the initial pop-up distance of the traffic-rated utility vault cover to any desired distance during the installation of the traffic-rated utility vault cover or the utility vault.

To combat the loss of pop-up distance problem, the applicant has devised an adjustable torsion lift system with one-way bias that provides the ability to set and reset the pop-up distance of the traffic-rated utility vault cover to the desired distance and to keep it at that distance for the entire lifespan of the utility vault cover, even after wear, weakening, or warpage of the torque member or tension member.

To combat the loss of pop-up distance problem, the applicant has devised an adjustable torsion lift system with one-way bias that provides the ability to "retention" or add more tension to the torque member or tension member after the torque member or tension member incurs wear, weakening, or warpage, without removing the adjustable torsion lift system with one-way bias from the utility vault cover or replacing components thereof, thereby providing the ability to keep the same pop-up distance for the entire lifespan of the traffic-rated utility vault cover without replacing the original torque member or tension member.

BRIEF SUMMARY OF THE INVENTION

It is an aspect of adjustable torsion lift system with one-way bias for traffic-rated utility vault cover to provide a lift mechanism or pop-up mechanism for a traffic-rated utility vault cover where the torque member or tension member does not incur any pressure, force, or torque in the positive direction from the weight of the hatch, as the hatch is opened or closed above the pop-up distance.

It is an aspect of adjustable torsion lift system with one-way bias for traffic-rated utility vault cover to provide a lift mechanism or pop-up mechanism for a traffic-rated utility vault cover that provides the ability to easily and quickly initially set the pop-up distance of the utility vault cover at any distance during installation of the utility vault cover or installation of the utility vault.

It is an aspect of adjustable torsion lift system with one-way bias for traffic-rated utility vault cover to provide a lift mechanism or pop-up mechanism for a traffic-rated utility vault cover that provides the ability adjust the pop-up distance of the hatch without retentioning or adjusting the torque member or tension member after any wear, weakening, or warpage of the torque member or tension member.

It is an aspect of adjustable torsion lift system with one-way bias for traffic-rated utility vault cover to provide a lift mechanism or pop-up mechanism for a traffic-rated utility vault cover that provides the ability to adjust the engagement point between the torque member or tension member and the hatch, which is the point where the weight of the hatch begins to push downward on the torque member or tension member.

It is an aspect of adjustable torsion lift system with one-way bias for traffic-rated utility vault cover to provide a lift mechanism or pop-up mechanism for a traffic-rated utility vault cover that provides the ability to retention or increase the upward force or torque upon the hatch after the torque member or tension member loses tension from wear, weakening, or warpage, without removing the adjustable torsion lift system from the utility vault cover.

BRIEF DESCRIPTION OF THE DRAWINGS

FIG. 4A is a side elevation view of best mode collar member.

FIG. 4B is a perspective view of best mode collar member.

FIG. 4C is a top plan view of best mode collar member.

FIG. 4D is a cross-sectional view of best mode collar member taken along its longitudinal bisection through the foot of T-slot.

FIG. 8A is a side elevation view of best mode fixed end socket without frame attachment means.

FIG. 8B is a front elevation view of best mode fixed end socket without frame attachment means.

FIG. 8C is a perspective view of best mode fixed end socket without frame attachment means.

FIG. 9A is an exploded perspective view of best mode fixed end socket with frame attachment means.

FIG. 9B is a perspective view of best mode fixed end socket with frame attachment means.

DEFINITION LIST

Figure 1:
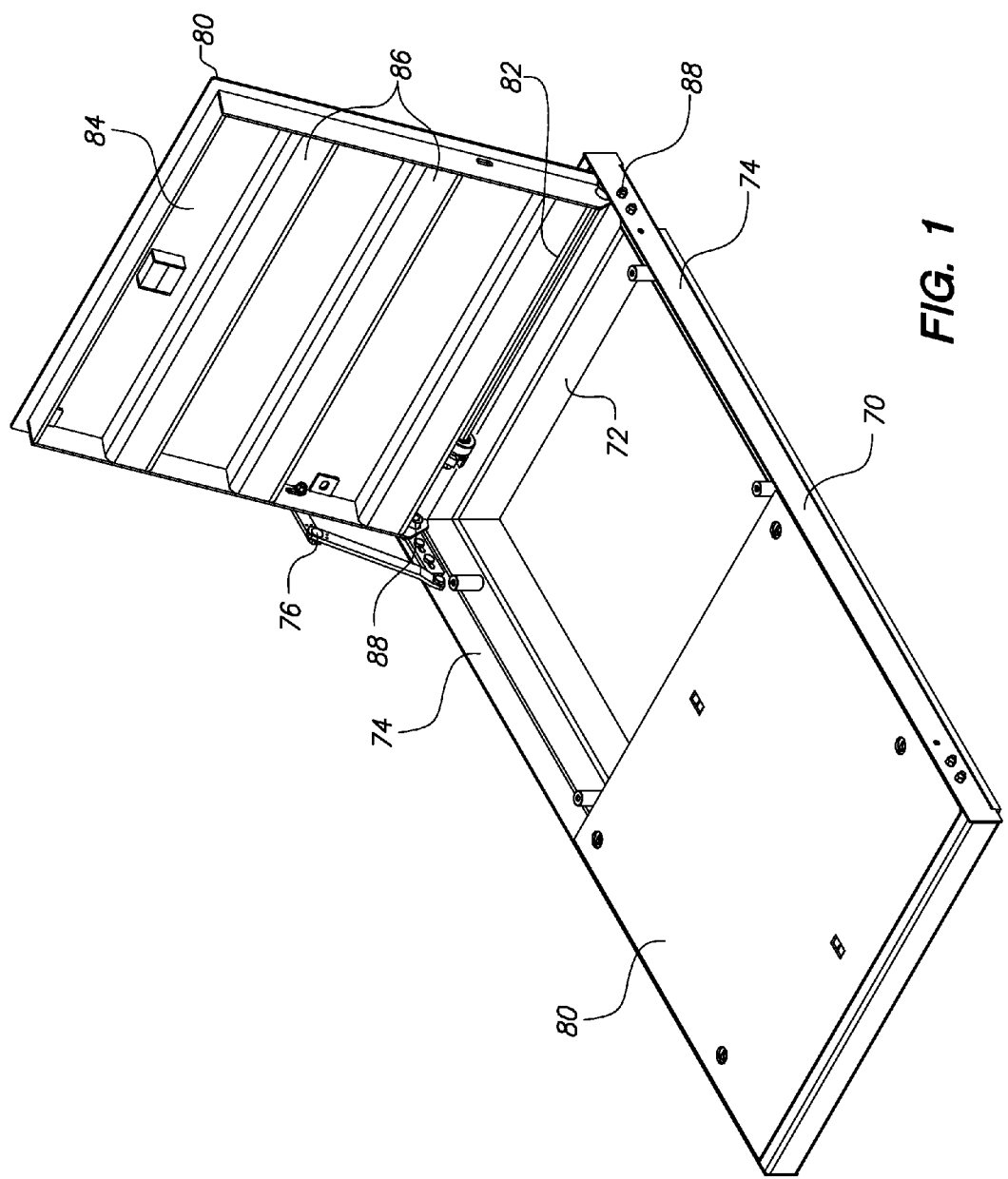
FIG. 1 is a perspective view of a traffic-rated utility vault cover with one adjustable torsion lift system with one-way bias installed per hatch.
Figure 2:
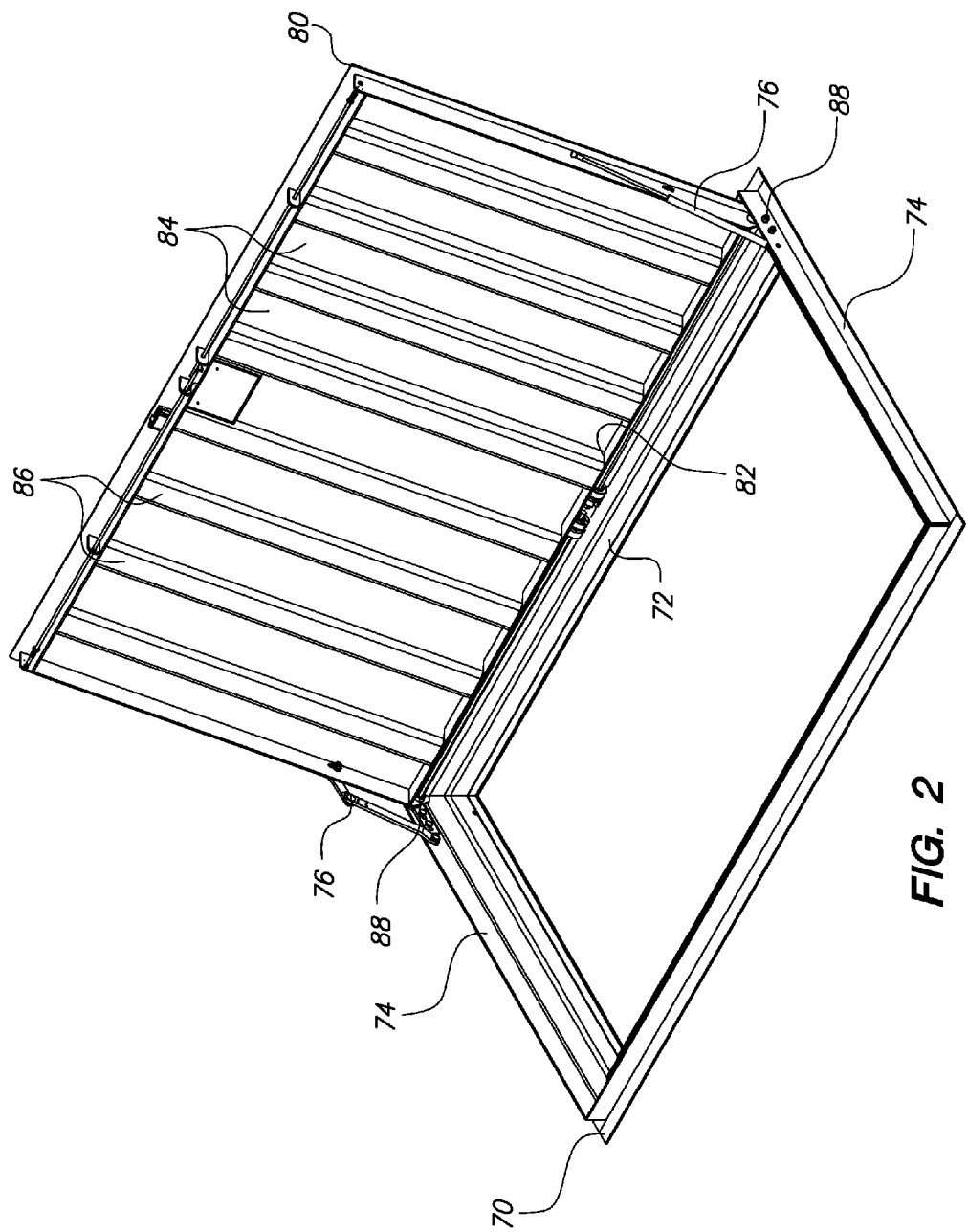
FIG. 2 is a perspective view of a traffic-rated utility vault cover with two adjustable torsion lift systems with one-way bias installed per hatch.
Figures 3, 3A:
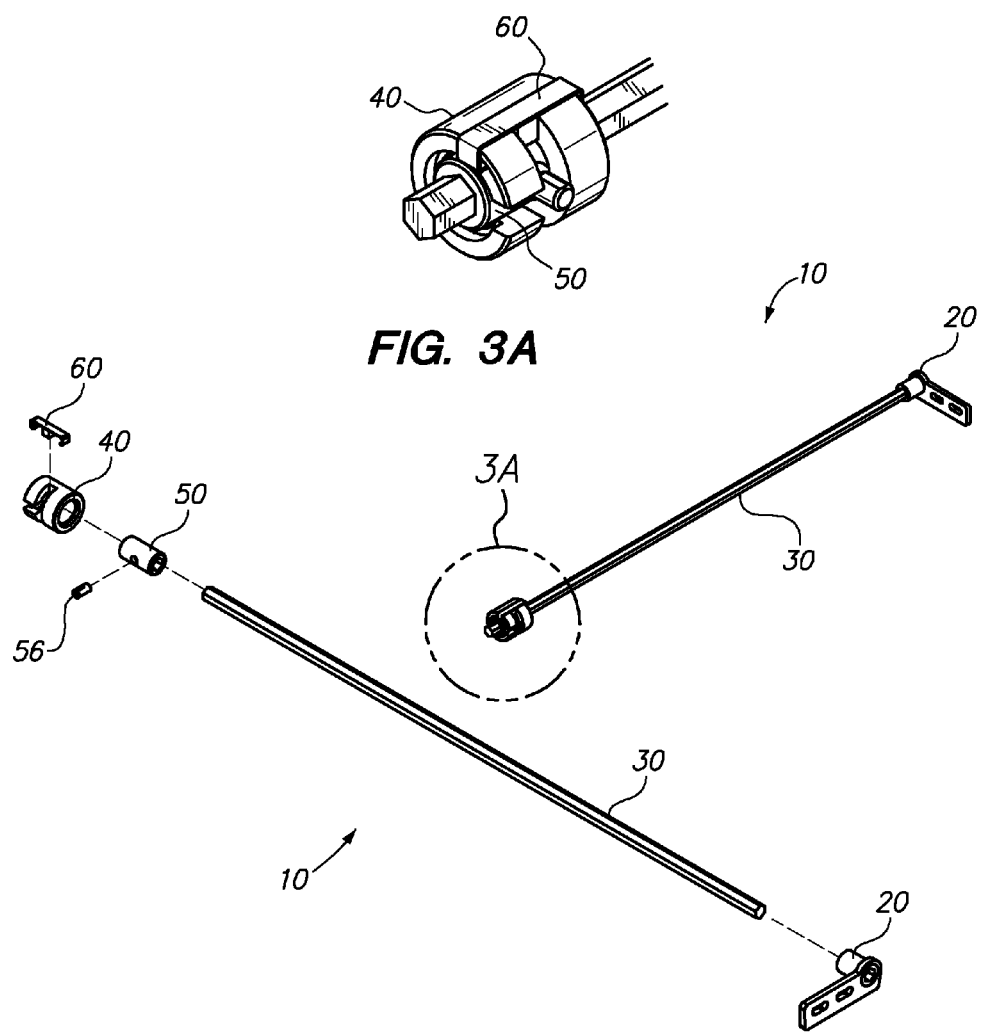
FIG. 3 is an exploded view and a perspective view of adjustable torsion lift system with one-way bias.
FIG. 3A is a blow-up view of one end of adjustable torsion lift system with one-way bias.
Figures 5A, 5B, 5C:
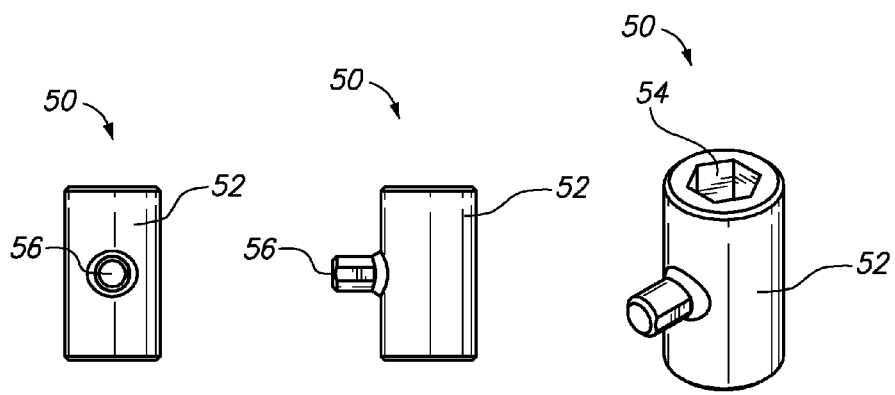
FIG. 5A is a top plan view of best mode floating end socket.
FIG. 5B is a front elevation view of best mode floating end socket.
FIG. 5C is a perspective view of best mode floating end socket.
Figures 5D, 5E:
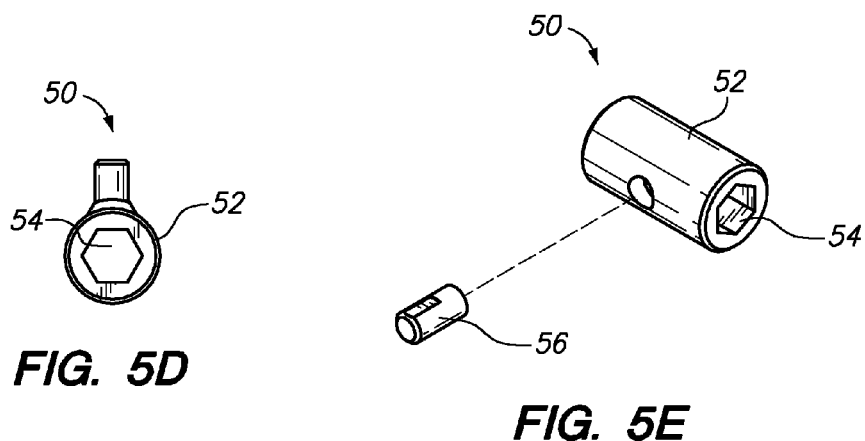
FIG. 5D is a side elevation view of best mode floating end socket.
FIG. 5E is an exploded perspective view of best mode floating end socket.
Figure 6A:
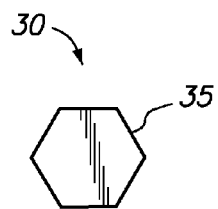
FIG. 6A is a side elevation view of best mode torsion bar member.
Figure 6B:
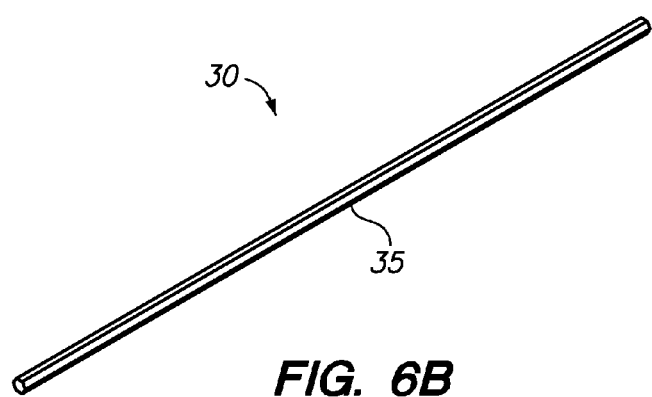
FIG. 6B is a perspective view of best mode torsion bar member.
Figure 6C:
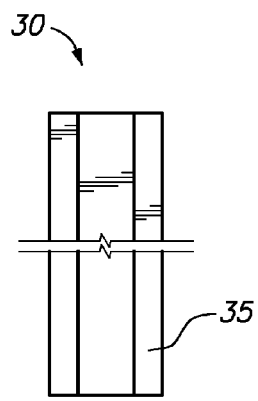
FIG. 6C is a top plan view of best mode torsion bar member.
Figure 7A:
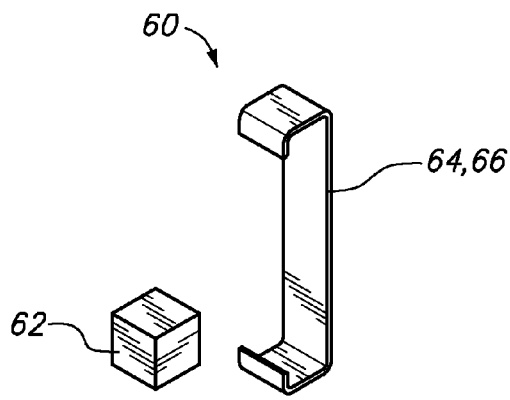
FIG. 7A is an exploded perspective view of best mode spacer member.
Figure 7B:
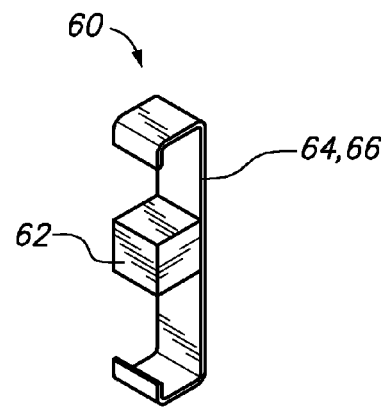
FIG. 7B is a perspective view of best mode spacer member.
Figure 7C:
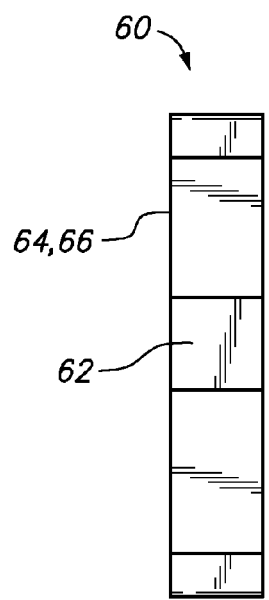
FIG. 7C is a bottom plan view, of best mode spacer member.
Figure 7D:
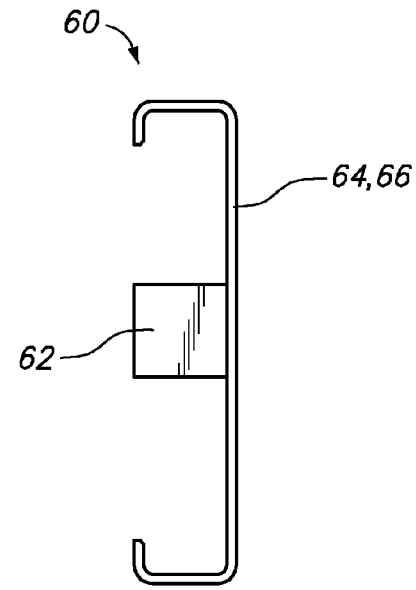
FIG. 7D is a side elevation view of best mode spacer member.

| Term | Definition |
| --- | --- |
| 10 | Adjustable Torsion Lift System with One-Way Bias |
| 20 | Fixed End Socket |
| 22 | Cylindrical Exterior |
| 24 | Polygonal Socket |
| 26 | Frame Attachment Means |
| 30 | Torsion Bar Member |
| 35 | External Polygonal Shape |
| 40 | Collar Member |
| 41 | Hollow Cylindrical Center |
| 42 | T-Slot |
| 43 | Foot of T-Slot |
| 44 | Arms of T-Slot |
| 45 | Slot End of Collar Member |
| 48 | Spacer Attachment Means |
| 49 | Clamp Slot |
| 50 | Floating End Socket |
| 52 | Cylindrical Exterior |
| 54 | Polygonal Socket |
| 56 | Ear Member |
| 60 | Spacer Member |
| 62 | Spacer Mass |
| 64 | Collar Attachment Means |
| 66 | Clamp Bracket |
| 70 | Frame |
| 72 | Attachment Leg of Frame |
| 74 | Adjacent Leg of Frame |
| 76 | Locking Arm |
| 80 | Traffic-Rated Hatch |
| 82 | Attachment Edge of Hatch |
| 84 | Floor Plate |
| 86 | Supporting Framework |
| 88 | At Least Two Pivot Holes |

DETAILED DESCRIPTION OF THE INVENTION

A utility vault is typically a rectangular or square cuboid or box-shaped room. The utility vault cover is typically the upper face of the cuboid or placed onto the upper face of the cuboid. A utility vault cover is typically rectangle-shaped or square-shaped. A utility vault cover may have a hatch pivotally attached at one of its ends to the upper edge of one of the cuboid's vertical faces or to the upper face of the cuboid. Alternately, a utility vault cover may have a "drag-off" hatch without pivotal attachment to the cuboid. The hatch of a utility vault cover is typically rotated upward or removed completely to open the cover and gain access to the utility vault. This invention pertains to the pivotally attached hatch design.

A hinged traffic-rated utility vault cover comprises: a hatch 80 pivotally attached to a frame 70. Frame 70 is a closed-perimetered rigid planar framework assembly with an open center that is typically rectangular-shaped or square-shaped to fit the specific cuboid dimensions of the utility vault. Frame 70 is attached to the utility vault at the upper edges of the vertical faces of the cuboid or to the upper face of the cuboid and is positioned horizontally. Frame 70 and utility vault are typically embedded into the ground with the upper surface of the frame 70 generally flush with the upper surface of the ground of the surrounding area, which is typically earth, concrete, asphalt, or similar. The open center of frame 70 is used for human ingress and egress to the utility vault.

Hatch 80 is a rigid solid planar member sized to fit and cover the upper face of the cuboid-shaped utility vault and to marry with frame 70 to make a semi-weather-tight connection with frame 70 when the hatch is closed. Hatch 80 is typically square or rectangular shaped. One edge of the hatch 80, labeled the attachment edge 82, is pivotally attached along one leg of frame 70, labeled the attachment leg 72, so that the edge of the hatch 80 opposite the attachment edge 82 may be lifted upward to open hatch 80 and pushed downward to close hatch 80, as the hatch 80 pivots at the opposite end at the attachment edge 82. The pivotal attachment of hatch 80 to frame 70 is accomplished by adjustable torsion lift system with one-way bias 10.

Adjustable torsion lift system with one-way bias 10 is a hinge member which functions as a pivot bearing to pivotally attach the hatch 80 to the frame 70. Adjustable torsion lift system with one-way bias 10 is a heavy-duty design that may be used with traffic-rated utility vault covers. Adjustable torsion lift system with one-way bias 10 functions as a positive-biased hinge member or pivoting bearing to connect hatch 80 to frame 70 and allow rotational motion relative to each other about a fixed axis-of-rotation with a net force acting to push hatch 80 in the open direction along a limited range of hinge movement. Frame 70 is stationary and affixed to the utility vault under ground, thus, hatch 80 is the only true rotating member.

Adjustable torsion lift system with one-way bias 10 comprises: a fixed end socket 20, a torsion bar member 30, a collar member 40, a floating end socket 50, and, optionally, a spacer member 60. A description of each sub-component and its installation procedure is presented to further describe adjustable torsion lift system with one-way bias 10.

Fixed End Socket 20 is a rigid cylindrical-shaped member with an cylindrical exterior, a hollow interior, and at least one slot end. Cylindrical exterior 22 of fixed end socket 20 is a cylindrical-shaped smooth hard bearing surface for the hatch 80 to pivot around. The cylindrical exterior 22 of the fixed end socket 20 functions as a hinge pin or center-of-rotation for the hinge member that is the adjustable torsion lift system with one-way bias 10.

At least two fixed end sockets 20 are required to pivotally attach the hatch 80 to the frame 70. Typically, this requirement is met by installing two adjustable torsion lift systems with one-way bias 10 per hatch 80, which yields two fixed end sockets 20 per hatch 80. Alternately, however, one adjustable torsion lift system with one-way bias 10 per hatch 80 may be used and installed where an additional fixed end socket 20 is installed as the second hinge pin without installing the remainder of the second adjustable torsion lift system with one-way bias 10. In the latter case, it is not required for the additional fixed end socket to have a hollow interior.

The hollow interior of fixed end socket has a polygonal-shaped internal cross-section running uniformly down the longitudinal axis of fixed end socket 20 and out at least slot end of fixed end socket 20. The polygonal-shaped horizontal cross-section may be triangular, square, rectangular, parallelogram-shaped, rhombus-shaped, pentagonal, hexagonal, heptagonal, octagonal, decagonal, or other polygon shape. The polygonal-shaped horizontal cross-section has at least one slot end to form a polygonal socket 24. In the case of two slot ends, the polygonal socket 24 would have two slot ends and thus would be tube-shaped rather than socket-shaped. Best mode is two slot ends because the cost of manufacture is less, however, only one slot end is required for the design. Both the one-slot end and two-slot end structures are labeled polygonal socket 24. Polygonal socket 24 functions to slide over and grip onto one end of the torsion bar member 30, which has a similarly-shaped polygonal exterior shape.

The polygonal socket 24 of the fixed end socket 20 and the similarly-shaped polygonal exterior shape 35 of the torsion bar member 30 must be sized to complement or pair with each other or to marry together to form a slip-fit or clearance-fit between the internal polygonal shape 24 of the fixed end socket 20 and the similar-shaped polygonal exterior shape 35 of the torsion bar member 30 to allow the fixed end socket 20 to smoothly and easily slide onto one end of the torsion bar member 30 with just enough clearance for a smooth action, but not with too much clearance or too loose a fit to allow the fixed end socket 20 to "strip" or "slip" around the torsion bar member 30 or to change rotational position relative to that of the torsion bar member 30 by rotating past or slipping across one or more vertices of the polygonal exterior shape 35 of the torsion bar member 30, thereby becoming "stripped".

Fixed End Socket 20 further comprises a frame attachment means 26. Frame attachment means 26 functions to permanently attach or removably attach the fixed end socket 20 to the frame 70 of the utility vault cover. Frame attachment means 26 includes attachment by welding, soldering, gluing, bolting, or screwing the cylindrical member with a polygonal-shaped hollow interior onto the frame 70 of the utility vault cover. Frame attachment means 26 could simply be welding, soldering, or gluing the cylindrical member with internal polygonal shape directly to the frame 70. Alternately, frame attachment means 26 could include additional structure, in the form of a lip member or ear member welded, soldered, glued, bolted, or screwed onto the cylindrical member with internal polygonal shape, where the additional structure is then used to weld, solder, glue, bolt, or screw directly the frame 70.

At least two fixed end sockets 20 are used to form the hinge member. At least two fixed end sockets 20 are rigidly attached to the frame 70. One fixed end socket 20 is attached to the inside surface of one leg of the frame 70, adjacent to the attachment leg 72. The other fixed end socket 20 is attached directly across from the first, on the opposing inside surface of the other leg of the frame 70, adjacent to the attachment leg 72. The two fixed end sockets 20 are positioned and attached to the frame 70 with a common longitudinal axis that is parallel with that of the attachment leg 72 of the frame 70. The common longitudinal axis of the two fixed end sockets 20 is the axis-of-rotation of hatch 80.

Typically, the axis-of-rotation of hatch 80 is positioned a few inches in from the inside surface of the attachment leg 72 of the frame 70. This gap between the axis-of-rotation and the inside surface of the attachment leg 72 of the frame is required to provide clearance for the attachment edge 82 of the hatch 80 to swing down to open and swing up to close, so that the hatch 80 and the frame 70 form a gapless, flush, and semi-weather-tight connection between these members when the hatch 80 is closed. In order to provide a gapless, flush, and semi-weather-tight connection, the design calls for the large portion of the hatch 80 lying on one side of the axis-of-rotation to rotate upward during the opening process of the hatch 80, while calling for the small portion of the hatch 80 on the other side of the axis-of-rotation to rotate downward during the opening process, where these rotation directions are reversed during the closing of the hatch 80. To get the gapless, flush, and semi-weather-tight connection, the axis-of-rotation of the hinge member must be located on-plane with the frame 70 planar member. This hinge arrangement is atypical because most hinges have an axis-of-rotation that is not on-plane with the frame.

Hatch 80 comprises: a floor plate 84 and a supporting framework 86. Supporting framework 86 is permanently attached to the lower surface of the floor plate 84 to provide structural support for the floor plate 84. Supporting framework 86 includes beams or joists extending vertically downward, perpendicular to the lower surface of floor plate 84, around the full perimeter of floor plate 84. Floor plate 84 is the ceiling and/or roof of the utility vault and represents the floor for vehicles or pedestrians to walk overtop. The upper surface of floor plate 84 must be flush with the upper surface of the ground or surface surrounding the utility vault cover when the hatch 80 is closed. This design is required to yield a sturdy hatch 80 that can support the weight of traffic above without defection and also provide a smooth surface for traffic to drive over.

Supporting framework 86 further comprises at least two pivot holes 88 which function as follows. The pivotal attachment of the hatch 80 to frame 70 occurs between the at least two pivot holes 88 in the supporting framework 86 of hatch 80 and the at least two fixed end sockets 20 attached to frame 70. At least two pivot holes 88 are precisely located and sized holes installed into the beams or joists of the supporting framework 86 of the hatch. One pivot hole is located on each edge of hatch 80, adjacent to the attachment edge 82, as shown in the figures. At least two pivot holes 88 are bearing holes. At least two pivot holes 88 function as a bearing surface to pivot around the cylindrical exterior 22 of fixed end sockets 20, which function as the hinge pins for the pivotal attachment. Two pivot holes 88 are required, where each pivot hole must align with one of the at least two fixed end sockets 20. At least two pivot holes 88 must be precisely sized and located to yield a slip fit or clearance fit over fixed end socket 20 to provide smooth opening and closing of hatch 80 by rotation around this bearing. The clearance must remain precise and consistent across the full rotation of hatch opening and closing, resulting in a smooth mechanical action to open and close hatch 80 yielding a gapless, flush, and semi-weather-tight connection when the hatch 80 closed.

Torsion bar member 30 is a semi rigid oblong member in the form of a bar or rod typically made of metal. Torsion Bar Member 30 resists compression and elongation longitudinally and laterally however allows distortion rotationally about its longitudinal axis by allowing the torsion bar member to twist with the application of torque about its longitudinal axis. The larger the torque force about the longitudinal axis of the torsion bar member 30, the more the torsion bar member 30 twists. Torsion bar member 30 is semi rigid so it returns pressure or torque in the opposite direction to that of the torque acting on the torsion bar member 30. The more the torsion bar member 30 twists, the larger the degree of return torque the torsion bar member 30 exerts back, so there is a directly proportional relationship.

If one end of torsion bar member 30 is held fixed while the other end is allowed to rotate, with torque applied, the torsion bar member 30 functions as a torsion spring member. A torsion spring member returns torque in the direction opposite to that of the torque applied, always returning torque force in the opposite direction, attempting to return the torsion spring back to its equilibrium position. The equilibrium position is the rotational position of the torsion bar member 30 at rest, at which time and position that there is no torque force applied in any direction to the torsion bar member 30. Torsion bar member 30 returns torque in both directions about its equilibrium position. The amount of return torque exerted by the torsion bar member 30 is proportional to the amount of twist achieved by the applied torque.

The exterior surface of the torsion bar member 30 has a polygonal shape 35 running uniformly along the full length of the oblong member to form an external polygonal-shaped lateral cross-section. The external polygonal-shaped lateral cross-section is triangular, square, rectangular, parallelogram-shaped, rhombus-shaped, pentagonal, hexagonal, heptagonal, octagonal, decagonal, or other polygon shape. The external polygonal shape 35 of the torsion bar member 30 functions to allow either end of the torsion bar member 30 to slide into and grip onto the polygonal socket 24 of the fixed end socket 20 and the polygonal socket 54 of the floating end socket 50, which each have identically shaped polygonal sockets or internal shapes. Internal polygonal sockets 24,54 and the similarly-shaped polygonal exterior shape of the torsion bar member 30 must be sized to complement or pair with each other or to marry together to form a slip-fit or clearance-fit between polygonal sockets 24,54 and the similar-shaped external polygonal shape 35 of the torsion bar member 30 to allow polygonal sockets 24,54 to smoothly and easily slide longitudinally over one end of the torsion bar member 30 with just enough clearance for a smooth action, but not with too much clearance or too loose a fit to allow either polygonal socket 24,54 to "strip" or "slip" around the torsion bar member 30 or to change rotational position relative to that of the torsion bar member 30 by rotating past or slipping across one or more vertices of the external polygonal shape 35 of the torsion bar member 30, when the polygonal socket 24,54 is rotated about is longitudinal axis while the torsion bar member 30 is held steady, thereby allowing the socket 24,54 to rotate past or slip across one or more vertices of said external polygonal shape 35, thereby becoming "stripped".

Collar member 40 is a rigid hollow cylindrical member with slot ends. Collar member 40 is rigidly attached to the hatch 80 with its longitudinal axis coincident with the axis-of-rotation of the hatch 80. Because of attachment to the hatch at this location, collar member 40 rotates about its longitudinal axis in one direction and back the other way when the hatch is opened and closed respectively. Torsion bar member 30 and the floating end socket 50 are installed concentrically inside the hollow cylindrical center 41 of collar member 40 with the longitudinal axes of all three members coincident. The cylindrical hollow center 41 of the collar member 40 is a barrel-shaped smooth hard bearing surface with slot ends that pivots around the cylindrical exterior 52 of floating end socket 50. The hollow cylindrical center 41 of the collar member must be precisely sized to yield a slip fit or clearance fit over the cylindrical exterior 52 of the floating end socket 50 to provide smooth opening and closing of the hatch 80 by rotation of this bearing. Torsion bar member 30, floating end socket 50, and collar member 40 are all installed with their longitudinal axes coincident with each other and with that of the at least two fixed end sockets 20; these components of the hinge member are required to be on the same axis in order to yield smooth pivotal action with the pivotal connect between the hatch 80 and the frame 70 because this is the axis-of-rotation of the hatch 80. Torsion bar member 30 is positioned along the axis-of-rotation with one end of the torsion bar member 30 inserted into the polygonal socket 24 of the fixed end socket 20 and the other end of the torsion bar member 30 inserted into the polygonal socket 54 of the floating end socket 50.

Floating end socket 50 is a rigid cylindrical-shaped member with hollow interior and at least one slot end. The cylindrical exterior 54 of floating end socket 50 is a cylindrical-shaped smooth hard bearing surface for the collar member 40 to pivot around. The cylindrical exterior 54 of the floating end socket 50 functions as a hinge pin or center-of-rotation for the collar member 40 to rotate around as hatch 80 is opened and closed.

The hollow interior of floating end socket 50 has a polygonal-shaped horizontal cross-section running uniformly down the full length of the cylindrical member. The polygonal-shaped horizontal cross-section is triangular, square, parallelogram-shaped, rhombus-shaped, pentagonal, hexagonal, heptagonal, octagonal, decagonal, or other polygon shape. The polygonal-shaped horizontal cross-section has at least one slot end to form a polygonal socket 54. In the case of two slot ends, polygonal socket 54 would have two slot ends and thus would be a tube-shaped rather than socket-shaped.

Polygonal socket 54 functions to slide over and grip onto one end of the torsion bar member 30, which has a similarly-shaped polygonal exterior shape 35. The polygonal socket 54 of the floating end socket 50 and the similarly-shaped polygonal exterior shape 35 of the torsion bar member 30 must be sized to complement or pair with each other or to marry together to form a slip-fit or clearance-fit between the internal polygonal shape 54 of the floating end socket 50 and the similar-shaped polygonal exterior shape 35 of the torsion bar member 30 to allow the floating end socket 50 to smoothly and easily slide longitudinally over one end of the torsion bar member 30, but with not too much clearance or too loose a fit so as to allow the floating end socket 50 to "strip" or "slip" around the torsion bar member 30 or to change rotational position relative to that of the torsion bar member 30 by rotating past or slipping across one or more vertices of the polygonal exterior shape 35 of the torsion bar member 30, thereby becoming "stripped".

Floating end socket 50 further comprises an ear member 56. Ear member 56 is a rigid oblong member rigidly attached to the cylindrical exterior 52 of the floating end socket 50. Ear member 56 is positioned radially on the floating end socket 50, with one end attached to the outside surface of the cylindrical member, so that the oblong member stands perpendicular to the surface of the cylindrical exterior 52 of the floating end socket 50. Ear member 56 protrudes radially outward from the cylindrical exterior 52 of the floating end socket 50. Ear member 52 functions transfer any torque of force supplied from weight of the hatch 80 to the torsion bar member 30 and vice versa.

Collar member 40 further comprises a T-slot 42 or void channel shaped like a "T" in the cylindrical sides of the collar member 40. The T-shaped channel is a void in the cylindrical sides of collar member 40. The foot 43 of T-slot 42 is perpendicular to the ends of collar member 40 and breaches one end of collar member 40, which is designated the slot end 45 of collar member 40. The two arms 44 of the T-slot 40 are parallel to the ends of collar member 40 and form dead ends, so to speak, in the interior of the cylinder shaped member.

Each of the two arms 44 of the T-slot 42 may have different lengths or the same length. In best mode, each of the two arms 44 is the same length, which is a length that runs about one-quarter the distance around the outer circumference of the cylindrical exterior of the collar member 40. As stated above, collar member 40 is position horizontally with the slot end 45 either position on the left or the right. Thus, with the best mode design, one collar member design may be used with both configurations calling for either a left slot end or a right slot end design for collar member 40.

As stated, collar member 40 is rigidly attached to hatch 80. To install the torsion bar member 30, one end of torsion bar member 30 is inserted into the end of collar member 40 opposite the slot end 45 and into the hollow cylindrical center 41. The end of torsion bar member 30 is inserted through the collar member with to about six inches beyond the slot end 45 of collar member 40 in best mode.

T-slot 42 functions to accept the ear member 56 on the floating end socket 50 and to allow mechanical action of the ear member 56 to slide smoothly and cleanly along the foot 43 and both arms 44 of T-slot 42. Ear member 56 and T-slot 42 must be precisely sized and located to yield a slip fit or clearance fit between these members. Additionally, these members must have hard surfaces or coatings to allow many cycles of the action without wearing or eroding the surfaces. Ear member 56 is installed from the slot end 45 of the collar member 40 into the foot 43 of T-slot 42 to enter the arms 44 of T-slot 42. As stated, collar member 40 is positioned horizontally in the utility vault cover, thus, there is an upper arm of T-Slot 42 and a lower arm of T-Slot 42. Collar member 40 cycles rotationally upward and rotationally downward about an axis of rotation that is the longitudinal axis of the torsion bar member and the floating end socket during the opening and closing of hatch 80 respectively. Ear member 56 and floating end socket 50 are essentially stationary and do not rotate appreciably during hatch opening and closing. Thus, when hatch 80 is opened, ear member 56 effectively slides down the upper arm of T-slot to the lower arm of T-slot 42, even though it is actually collar member 40 that rotates around stationary ear member 56. Likewise, when hatch 80 is closed, ear member 56 effectively slides up the lower arm of T-slot to the upper arm and T-slot, even though it is actually collar member 40 that rotates around stationary ear member 56. When hatch 80 is closed, the upper arm or T-slot 42 "bottoms out", so to speak, and rests against ear member 56. This contact applies torque on the horizontal torsion bar member 30 in the downward direction which in turn causes torsion bar member 30 to produce torque in the opposite direction to yield torque force in the upward rotational direction. It is this upward torque that causes hatch 80 to pop-up upon the release of the latch and/or lock mechanisms.

Typically, two adjustable torsion lift systems with one-way bias 10 are installed per hatch 80. In this case, two collar members 40, one for each adjustable torsion lift system with one-way bias 10, are rigidly attached to the hatch 80. In this case, one collar member 40 would have its slot end 45 facing to the left and the other collar member 40 would have its slot end 45 facing to the right, as viewed from the front of hatch 80. In the case of one adjustable torsion lift system with one-way bias 10 installed per hatch 80, only one collar member 40 is rigidly attached to the hatch 80 with either a left open or right open configuration.

As stated above, to properly install adjustable torsion lift system with one-way bias 10, at least two pivot holes 88, fixed end sockets 20, torsion bar member(s) 30, collar member(s) 40, and floating end socket(s) 50 of a particular hatch 80 must have identical longitudinal axes that are horizontal. To accomplish this, at least two pivot holes 88 on hatch 80 are installed over the two fixed end sockets 20 attached to frame 70, with the torsion bar member(s) 30 simultaneously installed into the polygonal socket(s) 24 of fixed end socket(s) 20 and into the open center of collar member(s) 40 so that one end of the torsion bar member(s) 30 is completely inserted into a polygonal socket 24 of fixed end socket 20 and the other end of the torsion bar member(s) 30 is extended slightly beyond the slot end 45 of collar member 40.

Lastly, the floating end socket 50 is installed. As the polygonal socket 54 of the floating end socket 50 is installed onto the end of the torsion bar member 30, ear member 56 must be inserted into the foot 43 of the T-slot 42 at the slot end 45 of the collar member 40 into the arms 44 of the T-slot. From this position, when hatch 80 is opened and closed, ear member 56 effectively slides down and up along the arms 44 of the T-slot 42 respectively.

To set the initial pop-up distance of hatch 80, floating end socket 50 must be installed and positioned relative to the torsion bar member 30 in a certain rotational position. Prior to installing the floating end socket(s) 50, hatch 80 should be opened or rotated upward to the desired pop-up distance. Since traffic-rated hatches 80 are very heavy, this typically requires the use of a crane, forklift, or other automated lifting device. From this pop-up distance, the hatch 80 should then be opened or rotated upward additionally by about one-quarter turn or 90 degrees, which is designated the "additional rotation". Along with the additional rotation, a final rotation must typically be added which is just enough upward rotational to allow the polygonal socket 54 of floating socket 50 to slide onto the end of the torsion bar member 30 while ear member 56 is slid into the slot end 45 of the collar member 40 and down the foot 43 of the T-slot 42. Final rotation is required to align the polygonal socket 54 with the polygonal shape 35 of the torsion bar member 30.

The additional rotation of one-quarter turn or 90 degrees is specified because, in best mode, both arms 44 the T-slot 42 have a length that runs about one-quarter the distance of the outer circumference of the cylindrical exterior of the collar member 40. In any event, the amount of the additional rotation must match the angular proportion of the length of the upper arm of the T-slot as compared to the outer circumference of the cylindrical exterior of the collar member 40.

With floating end socket(s) 50 installed according to the above, hatch 80 may be closed and left unlatched and unlocked where hatch 80 should then pop-up to the desired set distance. This is because the closing of the hatch 80 causes the end of the upper arm of the T-slot 42 to rotate down and to contact the ear member 56 of the floating end socket 50, where the weight of the heavy hatch 80 then causes the ear member 56 to rotate downward, applying torque to the torsion bar member 30 that is held fixed at the other end, causing the twisting of the torsion bar member 30, and the resulting reverse torque exerted by the torsion bar member 30. This reverse torque then pushes back upward on the ear member 56 to push against the end of the upper arm of the T-slot 42 to cause the hatch 80 to pop-up.

If floating end socket 50 is properly installed, the pop-up distance should match the initially set position. If the pop-up distance is not correct, floating end socket 50 may be "repositioned" to alter pop-up distance. This is done as follows. Hatch 80 is lifted and floating end socket(s) 50 are removed, where the hatch 80 can then be repositioned as instructed above, adding in both the additional rotation and final rotation, and then reinstalling floating end socket(s) 50 as instructed above. In this way, the correct pop-up distance can always be set or reset.

The lower arm of the T-slot 42 allows hatch 80 to open without applying reverse torque to the torsion bar member 30. This is because hatch 80 may be rotated at least one-half turn upward from the pop-up position before ear member 56 contacts the end of the lower arm of the T-slot 42. This contact is not desired because it causes reverse torque or reverse bias on the torsion bar member 30. If hatch 80 is opened or lifted upward too far so that ear member 56 contacts the end of the lower arm of the T-Slot 42, this causes the torsion bar member 30 to twist in the opposite way of that which occurs during the closing of the hatch 80. This opposite twist is reverse bias torque or force on the torsion bar member 30. As stated above, reverse bias on the torsion bar member 30 causes premature wear, weakening, and/or warpage of the torsion bar member 30, thereby yielding a reduction in pop-up distance of the hatch 80. The hatch 80 may be rotated by one-half of one turn without said contact because, as stated above, the length of each arm of the T-slot is one-quarter turn or 90 degrees of the outer circumference of the collar member 40. With this design, the hatch 80 reaches the resting position on the locking arm 76 prior to ear member 56 contacting to the end of the lower arm of the T-slot 42.

As stated above, after a few years use of the utility vault cover, torsion bar member 30 wears, weakens, or warps, so that it does not rotate upward or push upward on the ear member to the degree that it did when it was newer. As a result, after the torsion bar member 30 wears, weakens, or warps, the pop-up position of the ear member decreases somewhat. To remedy this, a spacer member 60 is used to effectively raise ear member 56 back up to its rest position prior to wear, weakening, or warpage of the torsion bar member 30.

To install or swap out an already installed spacer member 60, hatch 80 should be lifted all the way up to rest onto the locking arm 76. In this position, there is no contact or tension between ear member 56 and the collar member 40. Thus, a spacer member 60 be simply be removed or added by hand as detailed below.

Adjustable torsion lift system with one-way bias may further comprise a spacer member 60. Spacer member 60 comprises: a spacer mass 62 and a collar attachment means 64. A spacer mass 62 is a mass of rigid material sized to fit inside the upper arm of T-slot 42 and to fill the space between the end of the upper arm of the T-slot and the ear member 56 of the floating end socket 50. In best mode, spacer mass 62 is cuboid or box shaped with width and height matching that of the upper arm of the T-slot 42 with a clearance fit between these members. However, spacer mass 62 could be of any shape to fill this space and prevent the ear member 56 from sliding around spacer mass 62 to rotate upward towards the end of the upper arm of T-slot 42.

Spacer mass 62 functions to support torque force originating from the torsion bar member 30 twisting the attached floating end socket 50, along with the attached ear member 56, preventing ear member 56 from rotating all the upward to the end of the upper arm of the T-slot 42. Ear member 56 is held away from and lower than the end of the upper arm of T-slot 42. Spacer mass 62 takes up the space between ear member 56 and end of upper arm 46. Variously sized spacer members 60 may be used. In best mode, spacer members 60 come in spacer mass 62 size increments of ⅛ of an inch ranging from ⅜ to 2 inches in size. Spacer mass 62 is rigid and sturdy enough to withstand this pressure without deforming.

Spacer member 60 adjusts the rotational engagement point of ear member 56 to push rotationally upward on collar member 40, allowing engagement at a lower rotational position of ear member 56 as compared to that without spacer member 60.

Collar attachment means 64 is a means to removably attach spacer mass 62 to collar member 40, with spacer mass 62 positioned and held steadily in the upper arm of the T-slot 42. Collar attachment means 64 includes bolting, screwing, gluing, clamping, bracketing, welding, soldering. Any means may be used to securely hold spacer mass 62 in the upper arm of T-slot 42 to successfully take up the space at the end of the slot 46. In best mode, collar attachment means 64 is a clamp bracket. Clamp bracket is a semi rigid oblong shaped bracket that is rigidly attached to the upper surface of the spacer mass 62. A clamp is located at each end of clamp bracket. As discussed below, in best mode, each clamp then clamps onto a clamp slot on each end of collar member 40. Clamp bracket positions and holds spacer member 60 in the upper arm of T-slot 42, thereby removably attaching spacer member 60 to collar member 40.

Collar member 40 may further comprise a spacer attachment means 48. Spacer attachment means 48 is a means to removably attach spacer member 60 to collar member 40. Spacer attachment means includes bolting, screwing, gluing, clamping, bracketing, welding, soldering. Any means may be used to securely hold the spacer mass 62 in the upper arm of the T-slot 42 to successfully take up the space at the end of the slot 46. In best mode, spacer attachment means 48 is a pair of clamp slots, one located at each end of collar member 40 on the exterior surface. Each clamp slot is positioned and sized to accept the clamp on each end of the clamp bracket collar attachment means 64 and to hold steady the spacer mass 62 in the end of the upper arm of the T-slot 42. As the clamp bracket is pressed onto the outside of collar member 40, the ends of the clamp bracket bend upward somewhat to slide over the sides of collar member 40 and into the clamp slots on the collar member 40 and to snap into place. To remove spacer member 60, the ends of the clamp bracket are lifted upward to reverse the process and to remove the spacer member 60 form the collar member 40. In this way the spacer member 60 is removably attached to the collar member 40.

Spacer member 60 must be removable so that different sized spacer members 60 may be used. Different sized spacer members 60 are useful in order to vary the specific size of spacer mass 62 or the amount of "lift" that may be required to exactly off-set the loss of torsion force of torsion bar member 30 after it wears, weakens, or warps. With an assortment of different sized spacer members 60, crews can set and reset the desired pop-up distance of the utility vault cover simply by adding a spacer member 60 or swapping out an installed spacer member 60 to yield the desired pop-up distance. Note that setting and resetting the pop-up distance in this way is accomplished without retensioning torsion bar member 30.

In order to retension the torsion bar member 30 after it wears, weakens, or warps, the following process should be completed. Hatch 80 is first lifted open all the way up to the rest on locking arm 76. Floating end socket 50 is then be removed from the slot end 45 of the collar member 40, as detailed above. To retension the torsion bar member 30, a wrench or equivalent must then be used to securely grab onto the torsion bar member 30 and rotate or twist the torsion bar member 30 downward and hold the downward twist on the torsion bar member 30. This process requires a large amount of force so a machine or a crew may be required to twist and hold torsion bar member 30 in this way. This "re-tensions" the torsion bar member 30 because the twist has a net result of increasing the upward torque force of torsion bar member 30. From the twisted and held position, crews must then reinstall collar member 40, as detailed above, without allowing the twisted torsion bar member 30 to unwind. If completed properly, this procedure results in increased pop-up torque force from torsion bar member 30. In this way, the pop-up distance can be reset to its original height, even after torsion bar member 30 wears, weakens, or warps. Note that increasing the pop-up distance in this way is accomplished without the use of spacer members 60.

What is claimed:

1. A hinge member providing a pivotal connection between a utility vault hatch and a utility vault frame comprising:
   a fixed end socket;
   a floating end socket;
   a torsion bar member; and
   a collar member; wherein
   said fixed end socket is a rigid cylindrical member with a cylindrical exterior surface, a hollow interior, and at least one open end, said cylindrical exterior surface being a smooth hard cylindrical bearing surface on which the utility vault hatch pivots around, said hollow interior having a polygonal-shaped horizontal cross-section running uniformly down the longitudinal axis of said fixed end socket and out said at least one open end to form a polygonal socket,
   said floating end socket is a rigid cylindrical member with a cylindrical exterior surface, a hollow interior, and at least one open end, said cylindrical exterior surface being a smooth hard cylindrical bearing surface on which said collar member pivots around, said hollow interior having a polygonal-shaped horizontal cross-section running uniformly down the longitudinal axis of said floating end socket and out said at least one open end to form a polygonal socket,
   said polygonal socket of said fixed end socket and that of said floating end socket are identical,
   said torsion bar member is a semi rigid oblong member in the form of a rod or bar with a first and second end wherein said torsion bar member resists compression and elongation longitudinally and laterally however allows distortion rotationally about its longitudinal axis by allowing said torsion bar member to twist with the application of torque about its longitudinal axis and to return torque in the opposite direction to the initial torque acting on said torsion bar member,
   said torsion bar member further comprises an external polygonal shape running uniformly along the full length of said torsion bar and from said first end to said second of said torsion bar member, where said external polygonal shape is the inverse shape of said polygonal socket of said fixed end socket and that of said floating end socket so that said first or said second end of said torsion bar member may slide into and rotationally grip with said polygonal socket of said fixed end socket and that of said floating end socket, where said polygonal socket of said fixed end socket and that of said floating end socket are sized to compliment, pair, or marry with said external polygonal shape of said torsion bar member, or vice versa, to form a slip-fit or clearance-fit between said polygonal sockets and said external polygonal shape to allow said polygonal socket of said fixed end socket and that of said floating end socket to slide longitudinally over said first or second end of said torsion bar member with just enough clearance for smooth insertion and removal longitudinally, but not with too much clearance or too loose a fit to allow said polygonal socket of said fixed end socket or that of said floating end socket to "strip" or "slip" around said torsion bar member or to change rotational position relative to that of said torsion bar member when said polygonal socket of said fixed end socket or that of said floating end socket is rotated about is longitudinal axis while said torsion bar member is held steady, thereby allowing said fixed end socket or that of said floating end socket to rotate past or slip across one or more vertices of said external polygonal shape of said torsion bar member,
   said collar member is a rigid cylindrical member with a cylindrical exterior surface, a hollow cylindrical center, a first open end, and a second open end,
   said fixed end socket is rigidly attached to the utility vault frame with its longitudinal axis coincident with the axis-of-rotation of the utility vault hatch, which causes said fixed end socket to remain stationary when the utility vault hatch is opened and closed,
   said collar member is rigidly attached to the utility vault hatch with its longitudinal axis coincident with the axis-of-rotation of the utility vault hatch, which causes said collar member to rotate about its longitudinal axis in one direction and rotate back in then other direction when the utility vault hatch is opened and closed,
   said hollow cylindrical center of said collar member is sized to yield a slip fit or clearance fit over said cylindrical exterior surface of said floating end socket to provide a smooth hard bearing surface that pivots around said cylindrical exterior surface of said floating end socket as the utility vault hatch is opened and closed,
   said floating end socket further comprises an ear member that is a rigid oblong member with an overall outer dimension, a first end, and a second end, wherein said ear member is rigidly attached to said cylindrical exterior surface of said floating end socket, positioned radially, with said first end attached to said cylindrical exterior surface and said second end standing perpendicular to said cylindrical surface of said floating end socket,
   said collar member further comprises a T-slot or a void channel shaped like a "T" in said cylindrical exterior surface of said collar member positioned so that the foot of said T-slot is perpendicular to said first and second open ends of said collar member and breaches said first open end of said collar member and the two arms of said T-slot are parallel to said first and second open ends of said collar member but do not breach with each other or with said first or second open ends of said collar member,
   said T-slot of said collar member functions to accept said ear member of said floating end socket through the foot of said T-slot and to allow the mechanical action of said ear member to slide along said T-slot where said overall outer dimension of said ear member is sized relative to the width of said T-slot to yield a slip fit or clearance fit between these members,
   said first end of said torsion bar member is inserted into said hollow cylindrical center of said collar member and then said second end of said torsion bar member is inserted into said polygonal socket of said fixed end socket so that said torsion bar member is installed concentrically inside said hollow cylindrical center of said collar member with the longitudinal axes of both members coincident with that of said fixed end socket and with the axis-of-rotation of the utility vault hatch, and
   said floating end socket is inserted into said hollow cylindrical center of said collar member while guiding said ear member of said floating end socket into said T-slot of said collar member and guiding said external polygonal shape of said torsion bar member into said polygonal socket of said floating end socket, thereby assembling said hinge member providing a pivotal connection between a utility vault hatch and a utility vault frame.

\* \* \* \* \*